Aug. 21, 1956   A. C. RISSBERGER, JR., ET AL   2,759,681
PLASTIC FILM REEL
Filed May 1, 1953
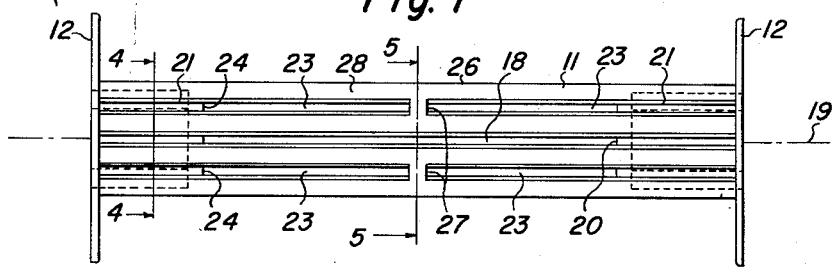
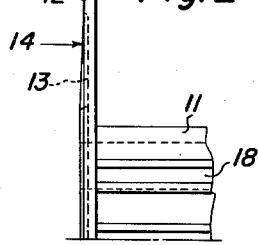
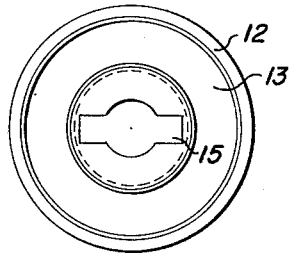
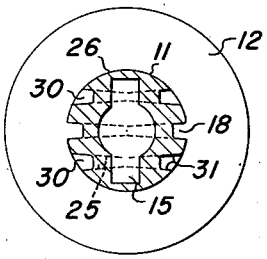    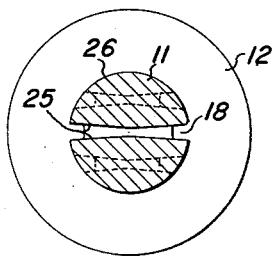
ARTHUR C. RISSBERGER JR.
HAROLD F. VIVIAN
INVENTORS
BY
ATTORNEYS

United States Patent Office 2,759,681
Patented Aug. 21, 1956

2,759,681

PLASTIC FILM REEL

Arthur C. Rissberger, Jr., and Harold F. Vivian, Rochester, N. Y., assignors to Eastman Kodak Company, Rochester, N. Y., a corporation of New Jersey Application May 1, 1953, Serial No. 352,484

1 Claim. (Cl. 242—71)

The present application relates to photography, and more particularly to a spool or support for roll film.

As is well known in the film art, such spools usually comprise a central core or hub, usually cylindrical, on which the film, or film and backing paper, is wound in convolutions. The ends of the core are usually provided with end flanges which extend radially from the core and engage the opposite marginal edges of the film or backing paper to afford the necessary light lock for the sensitized film. The core is provided with attaching means for the film, usually in the form of a slot through which the tapered end of the film or backing paper may be inserted.

Many prior spools were made of a combination of wood, metal, or all metal. Recently some such spools have been made of various plastic materials. However, if made of plastic the spool structure should be of such design as to reduce unnecessary material so as to decrease the weight as well as the amount of material required for the spool, but providing a uniform cross-section or thickness so as to eliminate shrink marks, distortion, and high pressure areas, while still providing sufficient strength to retain the roll film in a light locked relation on the spool. In addition to meeting the above qualifications, the plastic spool preferably should be of such design as to adapt it for use on automatic or semi-automatic film spooling machines.

One object of the invention is the provision of a new and improved one-piece plastic roll-film spool.

Another object of the invention is the provision of such a spool, the various parts of which are of uniform, symmetrical cross-section so as to eliminate shrink marks, distortion and high pressure areas.

Still another object of the invention is the provision of a plastic spool of the class described which is adapted for use on automatic or semi-automatic spooling machines.

Yet another object of the invention is the provision of such a spool which is simple in design, rugged, relatively inexpensive to manufacture, and highly effective in use.

To these and other ends the invention resides in certain improvements and combinations of parts, all as will be hereinafter more fully described, the novel features being pointed out in the claim at the end of the specification.

In the drawings:

Fig. 1 is a side elevation view of a one-piece plastic roll-film spool constructed in accordance with the present invention;

Fig. 2 is a partial front elevation view of the spool illustrated in Fig. 1, but on a larger scale than the latter, showing, in slightly more detail, the structure of the end flanges;

Fig. 3 is an end view of the spool illustrated in Fig. 1 showing the relation of the key engaging slot to the end flange and the core member;

Fig. 4 is a transverse sectional view taken through the core member in Fig. 1 and substantially on line 4—4 thereof, showing the relation of the central film receiving slot and the shallow end grooves, and also illustrating the symmetrical or uniform cross-section area of the core member; and Fig. 5 is a transverse sectional view taken through the core member illustrated in Fig. 1 and substantially on line 5—5 thereof, showing the relation of the central film receiving slot and the bridging members for the outer slots, and also the uniform and symmetrical cross-section area of the core member.

Similar reference numerals throughout the various views indicate the same parts.

The spool of the present invention comprises, in general, a cylindrical core member 11 and end flanges 12 positioned at the opposite ends of the core 11 and extending radially therefrom, as clearly illustrated in Fig. 1. The core 11 and flanges 12 are preferably formed from a suitable plastic material. While it is contemplated that the core and end flanges may be formed separately and then suitably connected, it is preferred to form the core and end flanges together so as to provide an integral one-piece structure. Each end flange 12 may be provided with an annular recessed area 13 on the outer surface 14 thereof, in which suitable designations; for example, the manufacturer's name and the size of film, may be inserted. Obviously, other designations may be placed in the area 13. One or both flanges 12 may be provided with an opening 15, of the shape best shown in Figs. 3 and 4, to receive the well known winding key which is usually carried by the camera structure.

The core member 11 is provided with a central axially extending slot 18 which lies substantially on the axis 19 of the core 11 and extends completely through the latter, as best shown in Fig. 5. The slot 18 is shorter than the core 11 so that the end walls 20 of the slot 18 terminate short of the end flanges 12 to provide bosses 21 at each end of the core 11. Each boss 21 is provided with an inwardly extending axial opening positioned in alignment with the key opening 15 so as to receive the camera winding key. The opening 15 and slot provide a receptacle and bearing for the camera key so that rotation of the latter will serve to turn the spool to wind the film hereon, as is deemed apparent to those in the art.

In order to eliminate unnecessary material and thereby reduce the weight of the core 11, hence the spool, the core 11 is provided with a pair of additional slots 23 positioned on opposite sides of and substantially parallel to the central slot 18, as shown in Figs. 1, 4 and 5. The end walls 24 of slot 23 are in radial alignment with the end walls 20 of the central slot 18, as illustrated in Fig. 1, so that all the slots 18 and 23 are of equal length axially of the member 11. Also, all the slots 18 and 23 are of substantially equal length chordally through the core member 11, as is apparent from an inspection of Figs. 4 and 5. In addition, the side walls 25 of slots 18 and 23 converge or taper inwardly from the outer surface 26 of the core member 11 so that the side walls 25 are spaced a greater distance apart at the surface 26 than at the core axis 19, as is deemed apparent from an inspection of Figs. 4 and 5.

With this arrangement, when the spool is threaded manually, the tapered end of the film or backing paper, not shown, may be positioned selectively in any of the slots 18 or 23. However, if the film or backing paper end is inserted in one of the outer slots 23, the material will be wound eccentrically on the spool, the disadvantages of which are deemed apparent. Accordingly, it is preferred to use only the central slot 18 to receive the film or backing paper end so as to provide a concentrically wound spool. Also, when the spool is used in connection with certain automatic or semi-automatic spooling machines, it is desirable to employ the central slot 18 to orient the spool with certain other parts of the spooling machine. To this end the present invention provides an arrangement by which the outer slots 23 are interrupted or non-continuous lengthwise so the film or paper end cannot be inserted in the outer slots 23 whereby the latter cannot be used to orient the spool with respect to the spooling machine.

To secure this result, the present invention interrupts, blocks or bridges the outer slots 23 so the latter are not continuous. Specifically, each outer slot 23 has positioned therein substantially at the center thereof, a blocking or bridging member 27 which connects the opposite side walls 25 of the slots 23 and which extends completely through the core 11, as best shown in Figs. 1 and 5. These bridging members 27 thus prevent the insertion of the film or paper end in either of the slots 23, and also prevent the use of the slots 23 for orienting the spool with relation to the spooling machine. The result is that only the central slot 18 is available for threading or orienting the spool. In addition to providing a means for blocking the slots 23, for the reasons set forth above, the bridging members 27 provide a central support for the thin wall portion 28 of the core member 11 between the outer walls of the slots 23 and the surface 26 of the member 11 to support said surface to retain the latter against bowing or bending when the film is wound on the core member, the advantages of which are deemed apparent.

The end portion of the core member 11 between the end walls 20 and 24 of slots 18 and 23, and the flanges 12, may be of the same diameter as the core 11. However, in order to reduce the weight of the core, as well as the amount of material necessary to form the spool, it is desirable to remove some of the material from the end portion. Such removal can obviously be done after the spool is formed, but it is desirable to effect such removal during the spool-producing operation. However, the amount of such removal should be such as not to interfere with the strength of the spool or core and to provide a uniform and symmetrical cross-section so as to eliminate distortion, shrinkage or high pressure areas. Also, as the said end portions are adjacent the flanges 12, the amount of removal must not be such as to cut through to the key receiving slot so as to destroy or interfere with the necessary bearing surfaces required for the winding key, as is deemed apparent.

Therefore, to effect such removal of the material while maintaining a uniform and symmetrical cross-section, and provide the necessary strength but without causing distortion or high pressure areas, the present invention provides a series of shallow axially extending grooves 30 in the end portion adjacent the flange 12. These grooves 30 form extensions of slots 18 and 23 and extend from the end walls 20 and 24 of the slots 18 and 23 respectively, to the flanges 12, as best shown in Fig. 1. The side walls 31 of grooves 30 are tapered or sloping and form continuations of the side walls 25 of slots 18 and 23. The bottoms of each groove 30 are spaced radially outward from the key receiving slot, as best shown in Fig. 4, so as to provide the necessary wall thickness therebetween.

Thus, the slots 18 and 23 are of equal length and extend over the greater portion of the core member 11, and terminate adjacent the end flanges 12 in shallow grooves 30, the side walls 31 of which are in alignment with and form a continuation of side walls 25 with the slots 18 and 23. Referring to Fig. 4, it is apparent that the arrangement of the central slot 18 and the grooves 30 provide a core structure adjacent the end flanges which is of symmetrical section and which will provide the desired strength and rigidity with the minimum of material, the advantages of which are deemed apparent. Also, as viewed in Fig. 5, the bridging members 27 provide a center core area which is symmetrical, strong, yet requires a minimum of material. While the bridging members 27 have been described and illustrated as being at the center of the slots 23, this is by way of illustration only. The particular position of the bridging members in the slot 23 may be determined by the particular spooling machine on which the spool is to be used. Therefore, the bridging members 27 may be positioned anywhere along the slots 23. Furthermore, while only one bridging member has been shown in each slot, additional members may be provided, if desired.

The present invention thus affords a plastic spool which is strong and symmetrical in cross-section so as to eliminate shrinkage marks, distortion and high pressure areas, yet requires a minimum of material consistent with tool design.

While one embodiment of the invention has been disclosed, it is apparent that the inventive idea may be carried out in a number of ways. This application is, therefore, not to be limited to the precise details described, but is intended to cover all variations and modifications thereof which fall within the scope of the appended claim.

What we claim and desire to secure by Letters Patent of the United States is:

A film spool comprising, in combination, a cylindrical core member and end flanges positioned at opposite ends of said core member, said core member being formed with five substantially parallel slots which extend completely through said core member, which slots have at least one end terminating at end wall positions which are in aligned relation short of said end flanges so as to provide end walls for said slots spaced from said end flanges, and which slots consist of a central slot extending from one end wall to the opposite end wall and a pair of shorter slots on each side of said central slot, which shorter slots each have less than half the axial length of the said central slot and each have a shorter chordal length than said central slot, the two slots in each pair of said shorter slots being axially aligned and separated by a bridging member which is an integral part of said core member, and said core member being formed with grooves aligned with said five slots and extending from said end wall positions to said flanges, said grooves extending only partially through said core member.

References Cited in the file of this patent

UNITED STATES PATENTS

| | | |
|---|---|---|
| 2,182,398 | Gantnier | Dec. 5, 1939 |
| 2,574,883 | Medal | Nov. 13, 1951 |

FOREIGN PATENTS

| | | |
|---|---|---|
| 414,984 | Great Britain | Aug. 16, 1934 |
| 629,067 | Great Britain | Sept. 9, 1949 |
| 711,705 | Germany | Oct. 4, 1951 |